(12) United States Patent
Sander

(10) Patent No.: US 7,253,948 B2
(45) Date of Patent: Aug. 7, 2007

(54) OPTICAL MAGNIFICATION DEVICE FOR DISTANCE VARIATION

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 11/380,105

(22) Filed: Apr. 25, 2006

(65) Prior Publication Data

US 2006/0245053 A1    Nov. 2, 2006

Related U.S. Application Data

(63) Continuation of application No. 10/342,752, filed on Jan. 15, 2003, now abandoned.

(30) Foreign Application Priority Data

Jan. 18, 2002    (DE) ............................. 102 01 835

(51) Int. Cl.
*G02B 21/22* (2006.01)

(52) U.S. Cl. ................ 359/376; 359/380; 359/678; 359/721

(58) Field of Classification Search ............. 359/381, 359/421, 422, 554, 557, 672, 674, 720, 837, 359/676, 678, 721; 351/169, 170
See application file for complete search history.

(56) References Cited

U.S. PATENT DOCUMENTS

| | | | |
|---|---|---|---|
| 3,305,294 A | 2/1967 | Alvarez | |
| 3,507,565 A | 4/1970 | Alvarez et al. | |
| 3,583,790 A | 6/1971 | Baker | |
| 3,758,201 A | 9/1973 | MacNeille | |
| 4,055,379 A * | 10/1977 | Winthrop | 351/171 |
| 4,062,629 A * | 12/1977 | Winthrop | 351/169 |
| 4,426,139 A | 1/1984 | van Ligten et al. | |
| 4,457,592 A | 7/1984 | Baker | |
| 4,925,281 A | 5/1990 | Baker | |
| 5,027,144 A | 6/1991 | Ohno | |
| 5,381,266 A | 1/1995 | Mizukawa et al. | |
| 5,535,060 A | 7/1996 | Grinblat | |
| 5,790,309 A | 8/1998 | Ohtake | |
| 6,067,195 A | 5/2000 | Hirunuma et al. | |
| 6,278,558 B1 | 8/2001 | Chang | |

OTHER PUBLICATIONS

Sigma Corporation (Tokyo, Japan), "Sigma Objektiv Katalog", publication date unknown.
Carl Zeiss AG (Germany), "Zeiss Brillengläser 1985" [Zeiss Eyeglasses 1985], Doc. No. 20-955-d, Jan. 1985.

* cited by examiner

*Primary Examiner*—Mark A. Robinson
(74) *Attorney, Agent, or Firm*—Hodgson Russ LLP

(57) ABSTRACT

An optical magnification device for varying the distance between an observer's eye (1) and an object (7), e.g., for a binocular magnifier or a microscope, in which focusing onto the object (7) is accomplished by means of progressive lenses (3) displaceable perpendicular to the observation beam(s) (2).

7 Claims, 2 Drawing Sheets

OPTICAL MAGNIFICATION DEVICE FOR DISTANCE VARIATION

CROSS REFERENCE TO RELATED APPLICATIONS

This application is a continuation of U.S. application Ser. No. 10/342,752 filed Jan. 15, 2003, now abandoned which claims priority of the German patent application 102 01 835.9, filed Jan. 18, 2002, which is incorporated by reference herein.

FIELD OF THE INVENTION

The invention concerns an optical magnification device, for example a binocular magnifier or a microscope, which permits a variation in the distance between an observer's eye and an object.

BACKGROUND OF THE INVENTION

A property often demanded for microscopes and binocular magnifiers is that the working distance of the optical device be capable of modification within a specific range, typically between 200 mm and 400 mm (also called the "focusing range"). At present, this is achieved by the fact that at least one optical element (for example, a lens element or a lens group) is shifted axially in the optical axis, bringing about a modification in focal length. This usually results in a change in overall length, cf. "Sigma Lens Catalog," Tokyo 201, 3 pages (no publication data), obtained in year 2000.

A presbyopic eye (having a lens no longer capable of accommodation) sees clearly only at one specific distance. This disadvantage is overcome by the use of eyeglasses. Lens elements in the form of a progressive lens have also recently become available. In a progressive lens, the refractive power of the corrective lens changes laterally (non-axially) over the surface of the eyeglass lens. As the eye looks through the areas of differing refractive power, for example from top to bottom, it can then see clearly at different distances despite poor accommodation.

Progressive lenses used today are made of inorganic optical glass materials or of plastics, e.g. polycarbonate, etc.

It is recognized that focusing on an object by means of axially displaceable lens elements or lens groups, as in the case of conventional microscopes, binocular magnifiers, etc., is disadvantageous in terms of the following aspects:
a) Changes in overall length.
b) Greater weight because of greater overall length.
c) Complex design solutions in some cases, if focusing is to occur in "open space," i.e., without a fixed housing having the corresponding mechanisms, for example in a binocular magnifier.
d) Lens groups are difficult to exchange, and the range of application for binocular magnifiers or microscopes is therefore limited.

SUMMARY OF THE INVENTION

It is therefore the object of the present invention to create a device which permits focusing on an object without axial shifting of lens elements and/or lens groups.

This object is achieved by the use of a progressive lens, known per se, in or on the binocular magnifier or in or on the microscope.

This technical innovation is based on the principle of conventional progressive eyeglasses, cf. the brochure entitled "Zeiss Brillengläser 1985 [Zeiss eyeglasses 1985]," Document no. 20-955-d, I/85, Jan. 1985.

If a progressive lens (described therein) is moved in front of or behind an optical instrument, focal length modification is thus obtained. In order to bring about the focal length modification, the movement of the lens is accomplished approximately perpendicular to the optical axis—in contrast to the known methods with axial shifting of the lens elements. For practical reasons, the progressive lens should be used in the closest possible proximity to the pupil. This also makes possible easy exchangeability of the progressive lens, thus creating different ranges of application.

Further possible applications are, for example, eyepieces, binoculars, telescopes, photographic lenses, and many other optical instruments that require focusing, focal length modification, or working distance modification.

The invention utilizes progressive lenses known per se, but for a different purpose, i.e., not for the correction of defective vision but for modification of the focal length of an optical magnification device.

The following improvements are obtained by way of the device described herein:
 Short overall lengths;
 Low weight.
 Usability in all optical instruments that require focusing, focal length modification, or working distance modification.

BRIEF DESCRIPTION OF THE DRAWINGS

The invention will be explained in more detail, by way of example, with reference to the figures in which.

DETAILED DESCRIPTION OF THE INVENTION

Figure 1:
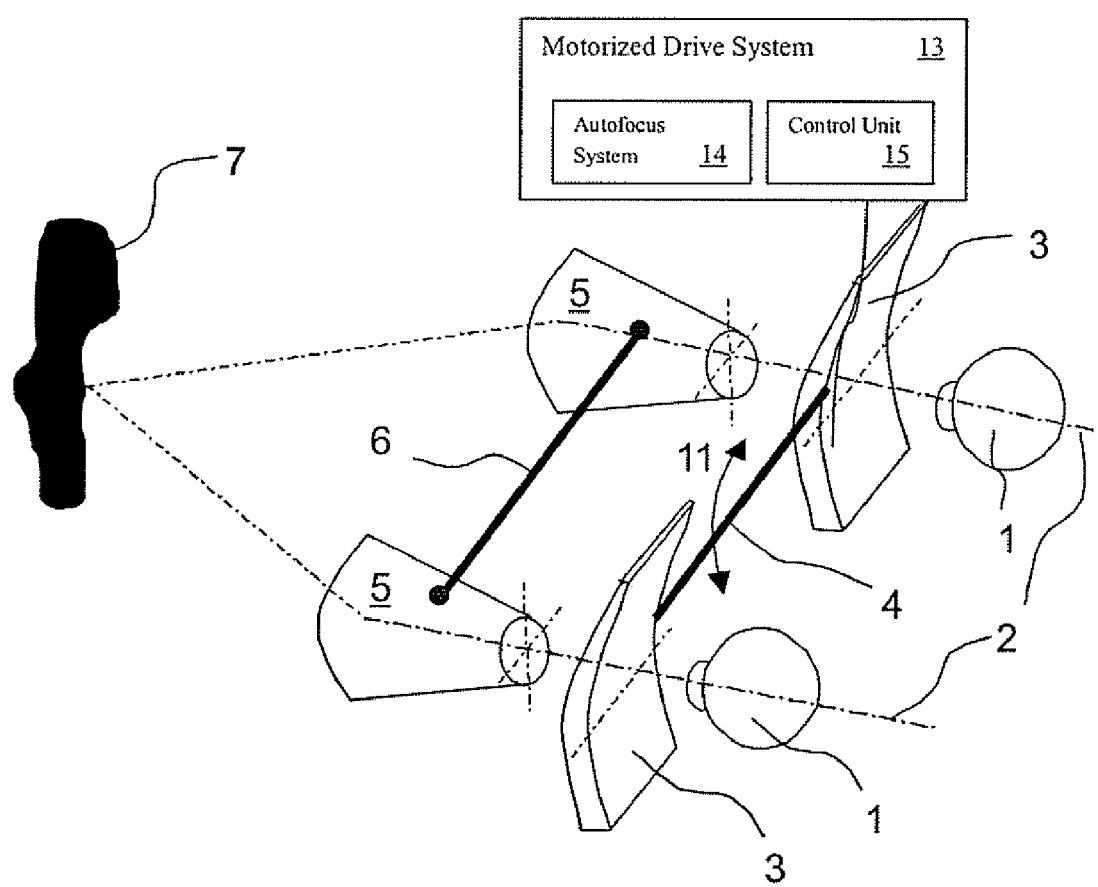
FIG. 1 shows a first embodiment of an optical device according to the present invention for distance variation (binocular magnifier)

In FIG. 1, light emitted or reflected by object 7 is directed via a binocular magnifier 5, joined by immovable connection 6, to two progressive lenses 3, guided together by common guidance system 4, which are arranged in the optical axis 2 of each of the observer's eyes 1. Light incident on progressive lenses 3 is refracted thereat and deflected to observer's eyes 1.

In order to achieve a focal length modification or a variation in the distance between observer's eye 1 and object 7, progressive lenses 3 are arranged displaceably in the lateral (non-axial) direction. In the context of stereoscopic viewing, the two progressive lenses 3 are displaced in parallel fashion. For that purpose, they are immovably connected to one another by common guidance system 4, in the context of binocular magnifier 5 shown here.

The entire system is embodied, for example in the application depicted here for a binocular magnifier, as an eyeglass frame; adjustment of the progressive lenses can be performed manually, by way of a drive system, or also in motorized fashion.

Instead of the up-and-down movement of progressive lenses 3, displacement can also occur on a circular arc segment in accordance with spherical double arrow 11, shown in FIG. 1; all that must be achieved, according to the present invention, is that zones of differing refractive power are successively pivoted in front of the pupil of the optical instrument (for example, in front of binocular magnifier 5). The invention of course also encompasses lateral (non-axial) displacement movements of progressive lenses 3.

Figure 2:
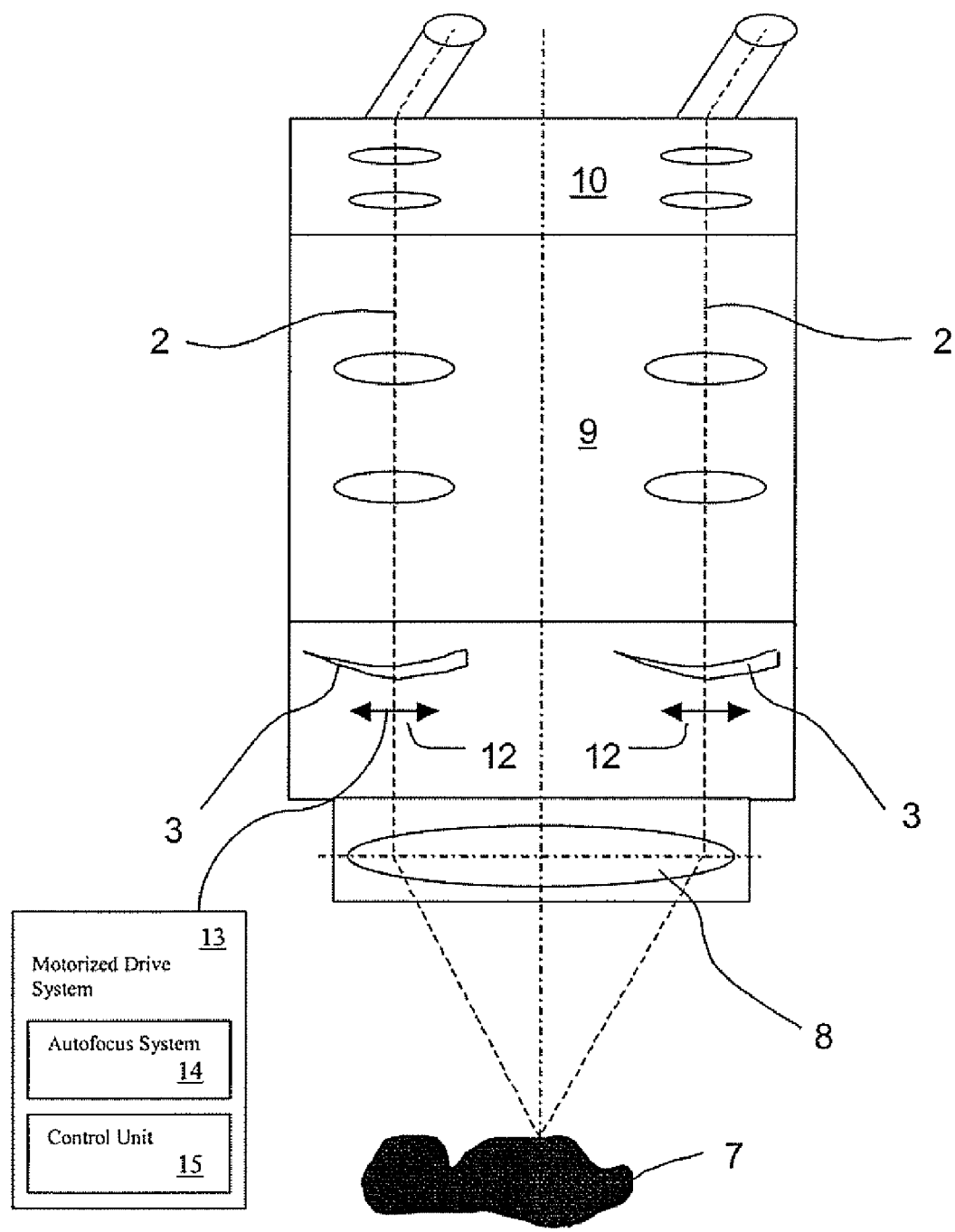
FIG. 2 shows a second embodiment according to the present invention (microscope).

FIG. 2 schematically depicts an optical device according to the present invention for distance variation, with reference to the example of a microscope.

Light striking the shared main objective 8 is refracted thereat and deflected to respective progressive lenses 3 (cf. double arrows 12), which are displaceable in a direction perpendicular to optical axes 2 of the two observation beams and are each located between main objective 8 and zoom 9. The light beams refracted at progressive lenses 3 are conveyed via zoom 9 to eyepiece tube 10.

A displacement of progressive lens 3 perpendicular to optical axis 2 of the observation region results in differing focal values (from observer's eye 1 to object 7).

The invention is not limited to stereoscopic beam paths, but rather is suitable also for monocular optical systems.

While the invention has been described in connection with certain embodiments, the description is not intended to limit the scope of the invention to the particular forms set forth, but, on the contrary, it is intended to cover such alternatives, modifications, and equivalents as may be included within the spirit and scope of the invention as defined by the appended claims.

PARTS LIST

1 Observer's eye(s)
2 Optical axis/axes of the two observation beams
3 Progressive lens
4 Common guidance system
5 Binocular magnifier
6 Immovable connection
7 Object
8 Main objective
9 Zoom
10 Eyepiece tube
11 Spherical double arrow (displacement on a circular arc segment)
12 Double arrow (displacement)
13 Motorized drive system
14 Autofocus system
15 Control unit

What is claimed is:

1. A stereomicroscope comprising:
a main objective;
a pair of beam paths passing through the main objective;
an eyepiece tube including a tube lens in each of the pair of beam paths;
a zoom lens system between the main objective and the eyepiece tube; and
exactly one pair of progressive lenses between the main objective and the eyepiece tube, the exactly one pair of progressive lenses being associated one progressive lens to each of the pair of beam paths, the exactly one pair of progressive lenses being displaceable laterally in the pair of beam paths as a unit to adjust focus of an object image viewed through the stereomicroscope.

2. The stereomicroscope of claim 1, wherein the exactly one pair of progressive lenses is displaceable laterally along an arc.

3. The stereomicroscope of claim 1, wherein the exactly one pair of progressive lenses is displaceable laterally along a line.

4. The stereomicroscope of claim 1, wherein the exactly one pair of progressive lenses is selectively removable from the pair of beam paths.

5. The stereomicroscope of claim 1, wherein displacement of the exactly one pair of progressive lenses is controlled manually.

6. The stereomicroscope of claim 1, further comprising a motorized drive system connected to the exactly one pair of progressive lenses for controlling displacement of the exactly one pair of progressive lenses.

7. The stereomicroscope of claim 6, wherein the motorized drive system includes an automatic focusing system and an electronic evaluation and control unit.

* * * * *